Jan. 6, 1970        T. A. KLYCE        3,487,499

APPARATUS FOR PEELING A CHAIN OF SAUSAGES

Filed Feb. 8, 1968        2 Sheets-Sheet 1

INVENTOR.
THOMAS A. KLYCE
BY John R. Walker, III
Attorney

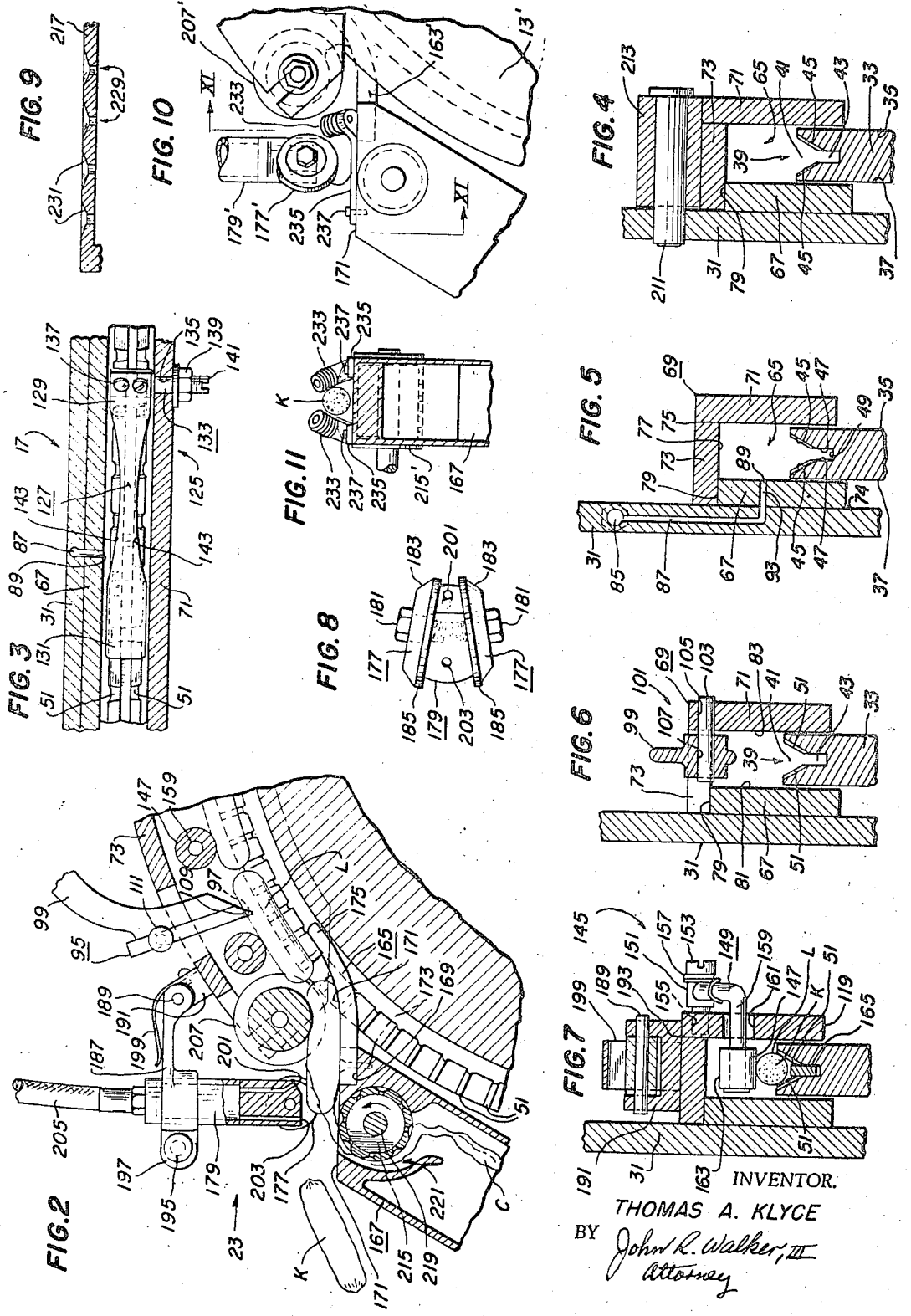

United States Patent Office 3,487,499
Patented Jan. 6, 1970

3,487,499
APPARATUS FOR PEELING A CHAIN OF SAUSAGES
Thomas A. Klyce, Memphis, Tenn., assignor to Ranger Tool Co., Inc., Ellendale, Tenn.
Filed Feb. 8, 1968, Ser. No. 707,012
Int. Cl. A22c 11/00, 13/00
U.S. Cl. 17—1                                 14 Claims

ABSTRACT OF THE DISCLOSURE

Sausage peeling apparatus particularly for peeling small cocktail frankfurter sausages. The apparatus includes a substantially large-diametered power-driven wheel having a grooveway around the rim of the wheel. The apparatus includes means for guidingly constraining the chain of sausages in the grooveway of the wheel and for moving the sausage chain in an arced path around substantially a quarter sector of the wheel. The apparatus includes a plurality of successionally arranged means for acting on the sausages as they move along the curved path including (1) oven means for heating the moving sausages; (2) knife means for slitting the sausage casing of each sausage link; (3) compressed air means for loosening the case from the sausage meat kernel; and (4) vacuum air means for remotely separating the string of meat-free casings from the meat kernels of the sausage chain.

BACKGROUND OF THE INVENTION

Field of the invention

Concerns improvements in sausage-peeling apparatus and particularly for peeling so called cocktail franks.

Description of the prior art

Sausage-peeling machines of the prior art generally are constructed to convey a chain of sausages longitudinally along a straight line path and include means for acting successionally on each sausage link as it is moved along the straight path. Many different mechanical elements and principles are utilized for conveying the sausages and for acting on the sausages as they are conveyed. Patents Nos. 2,623,237 and 2,779,968 disclose frank peeling structures which utilize conveyor belts and oppositely arranged conveyor chains respectively for conveying the sausages. Other sausage peeling machines such as those disclosed in Patents Nos. 2,636,213 and 3,312,995 illustrate frank peeling apparatus which convey and act on the chain of sausages by moving the chain of sausages between oppositely arranged pairs of wheels or rollers. Patent No. 2,954,579 shows disc members over which the sausage chain moves. The channel shaped path in which the franks move is of progressively decreasing depth from the inlet portion to the outlet portion. Patent No. 3,055,045 shows a pair of belts which move along with the franks over a wheel where the franks are cut. The typical prior art frank peeling machine is somewhat complicated and includes many complex or intricate parts subject to malfunction and which requires substantially constant maintenance. Many of the prior art machines were of such complex design as to require operators or attendants which were skilled in the operation and maintenance of the machine. Prior art machines of such complex design also were expensive to manufacture and market.

SUMMARY OF THE INVENTION

The inventive concept includes means for causing a sausage chain to be conveyed continuously in a curved line path around a quarter section rim portion of the large-diametered feed wheel, which has a uniform grooveway therein. The present invention includes means for positively driving each sausage link of a sausage chain continuously as the chain is moved along the curved line path of the machine, with the crowder means being substantially relative to the rotation of the wheel and spaced therealong. The machine is substantially mechanically simple and of compact design. It includes a minimum number of wheels, rollers or complex parts subject to malfunction. An unskilled operator or attendant of the machine may operate the machine effectively and may do so with substantially negligible practice. The compact substantially simple design of the frank peeling apparatus of the present invention is less costly to manufacture and market than are many of the prior art machines. An improved frank peeling machine is provided which will uniformly and consistently peel linked frankfurters or the like with less waste in time and material.

BRIEF DESCRIPTION OF THE DRAWING

FIG. 2 is substantially a vertical plane sectional view of the means for loosening and removing the skin casing from the meat of the chain of sausages (that part of the machine shown on the left in FIG. 1).

FIG. 3 is a horizontal plane sectional view taken as on the line III—III of FIG. 1.

FIGS. 4, 5, 6 and 7 are transverse sectional views taken respectively substantially along respective radians of the feed wheel and indicated IV—IV, V—V, VI—VI, and VII—VII, in FIG. 1.

FIG. 8 is a bottom view of the stripper wheel means of the invention as viewed upwardly in FIG. 1.

FIG. 9 is a fragmentary longitudinal sectional view of the rim of the vacuum wheel illustrating the configuration of the vacuum perforations or openings in the vacuum wheel rim.

FIG. 10 illustrates a second embodiment of the apparatus utilizing a pair of stripper rollers used in conjunction with the pair of stripper wheels.

FIG. 11 is a horizontal broken plane sectional view of the stripper roller means of the second embodiment taken as on the line XI—XI of FIG. 10.

DESCRIPTION OF THE PREFERRED EMBODIMENTS

Figure 1:
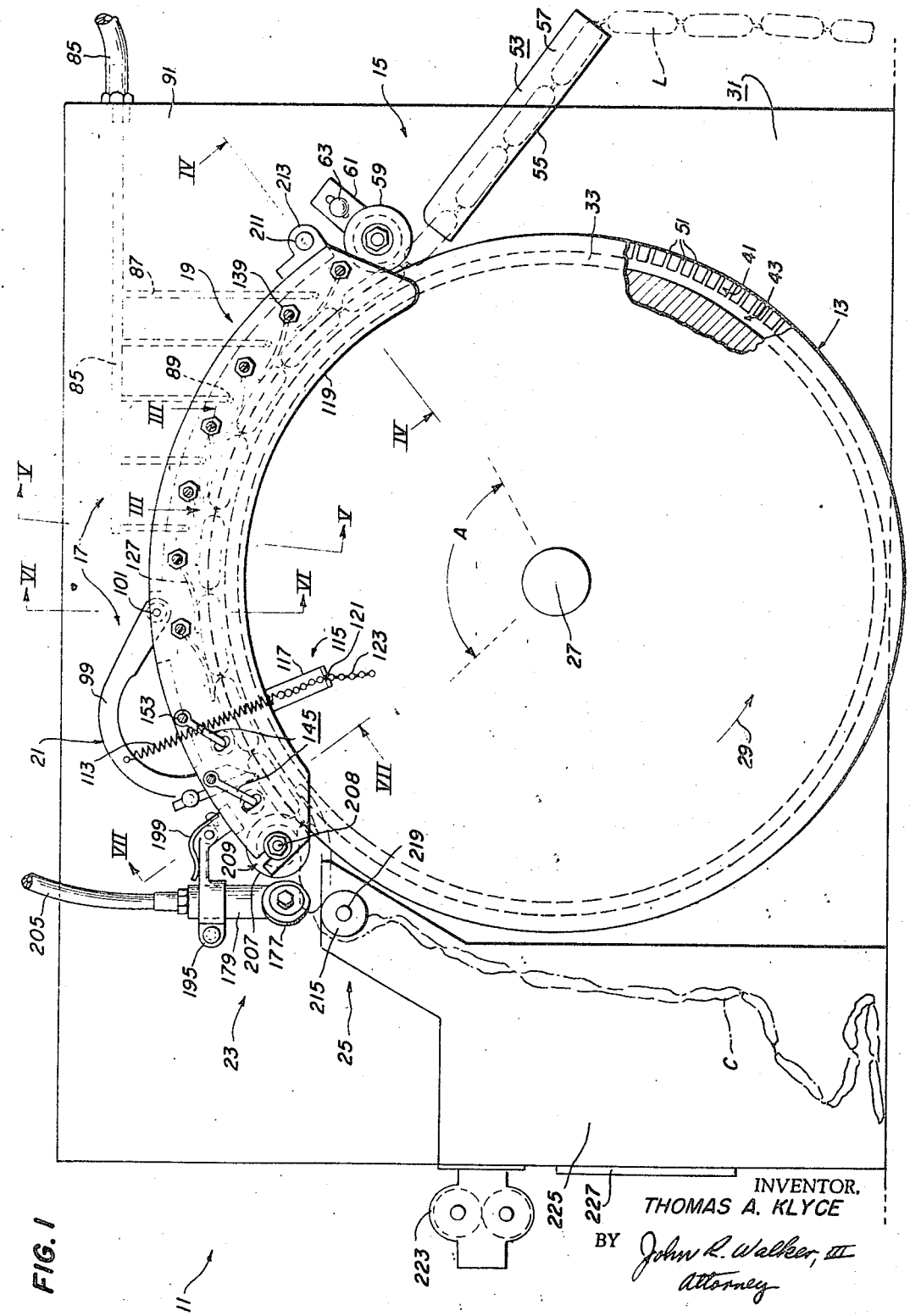
FIG. 1 is a front elevational view of the sausage peeling apparatus of the present invention with parts removed for purposes of clarity.

The frankfurter peeling apparatus of the present invention is indicated by numeral 11 and preferably includes the following basic components: A feed wheel 13 for drivingly conveying the sausage chain (indicated C) along a curved path; infeed means 15 for guidingly conducting sausage chain C onto the rim structure of feed wheel 13; crowder means 17 for resiliently urging the sausage chain against the rim structure of feed wheel 13; oven means 19 for heating the successive sausage links L of sausage chain C; knife means 21 for longitudinally slitting the sausage links L; means 23 for loosening the slit casing skin S from the sausage meat kernel K; and, means 25 for remotely separating the casings and meat kernels of the chain of sausages.

Feed wheel 13 is of large diameter and is supportedly journalled on a horizontal axis 27 and continuously driven unidirectionally in a direction indicated by arrow 29 in FIG. 1. Suitable gear or belt means, not shown, supported and housed in support structure 31 is adapted to drive wheel 13 at a relatively slow speed.

Feed wheel 13 includes a substantially narrow rim 33 defined substantially by front and back face surfaces 35, 37 (see FIGS. 4–7). Rim 33 of feed wheel 13 is provided with a grooveway 39 extending uniformly circumferentially about the wheel and opening radially outwardly thereof. Grooveway 39 preferably includes an outer circumferential grooveway space 41 and inner grooveway space 43 arranged concentrically radially inwardly of outer grooveway space 41 (see FIGS. 4 and 6). Outer grooveway space 41 is defined substantially by V-arranged grooveway surfaces 45, 45 symmetrically arranged between front and back face surfaces 35, 37 of feed wheel rim 33. Inner grooveway space 43 is defined substantially by forward and rearward radially extending parallel surfaces 47, 47 and a grooveway bottom surface 49 (see FIG. 5). The rim structure defining outer grooveway section 41 also preferably includes a plurality of oppositely arranged pairs of radial ribs 51, 51 uniformly spaced and arranged circumferentially about feed wheel rim 33.

A sausage link L is adapted to be received in outer grooveway section 41 with paired ribs 51, 51 frictionally engaging generally oppositely arranged cylindrical surface portions of links L (see FIG. 7). Sausage chain C is adapted to be received in grooveway outer section 41 and in approximately a 90° sector of feed wheel 13 (a 90° sector of feed wheel 13 is indicated A in FIG. 1). As wheel 13 is driven, sausage chain C will be moved continuously along a curved path defined substantially by the arced configuration of circular grooveway 39.

Infeed means 15 preferably includes a conductor slide 53 having a bottom wall 55 and upstanding side walls 57, 57 (one shown) and a conductor wheel 59 arranged adjacent the periphery of feed wheel 13. Conductor wheel 59 is idly journalled on a bracket 61 which in turn is adjustably secured by threaded fastener 63 to support structure 31 of the sausage peeling apparatus. Turnably manipulating fastener 63 permits radial adjustment of conductor wheel 59 toward and away from the periphery of feed wheel 13.

Oven means 19 includes structure defining a longitudinally arced transversely U-surfaced channelway 65 extending along the circumferential periphery of feed wheel sector A. Upon rotation of feed wheel 13 the rim portion thereof is adapted to convey sausage chain C through oven channelway 65. Channelway 65 preferably is defined by fixed and movable structure including a planar vertical back 67 fixedly secured on support structure 31, and a movable body 69 including front and top portions 71, 73 (see FIGS. 3–5). Back 67 is platelike, generally crescent-shaped, and is fixedly secured by suitable means (not shown) along surface intersection 74. Body 69 is generally L-shaped in transverse configuration and with front 71 and top 73 right angularly fixedly joined along surface intersections 75.

Body 69 is adapted to be arranged in an operative disposition with curved undersurface 77 of top 73 matingly engaging the top edge surface 79 of stationary back 67. The confronting inside surfaces 81, 83 (see FIG. 6) respectively of back 67 and body front 71 are spaced parallel with and a slight distance from front and back surfaces 35, 37 of feed wheel rim 33; the feed wheel rim is adapted to snugly but freely rotatably be received in inverted U-shaped channelway 65.

Live steam under pressure passing through supply conduit 85 is conducted into the space enclosed by channelway 65 and provides heat means for heating the sausage links. The steam passes through main conduit 85, through branch conduits 87 and issues jet-like from apertures 89 in the interior of channelway 65. Main conduit 85 preferably extends horizontally in edge portion 91 of support structure 31. Branch conduits 87 (five conduits being shown) extend downwardly in support structure 31 and each into a horizontal conduit section 93 extending transversely through channelway back 67. Suitable valve means (not shown) interposedly fitted in supply conduit 85 provide means for regulating the passage of steam into channelway 65 and regulates the heat in the channelway.

Knife means 21 provide means for longitudinally slitting the heated sausage links successively as the sausage chain moves through channelway 65. Knife means 21 includes a flat blade 95 having a downwardly projecting edge-sharpened pointed end 97 and blade supporting means including a curved blade carrier 99 pivoted at its proximal end by pivot pin means 101 to movable oven body 69 (see FIGS. 1 and 6). A pivot pin 103 fixedly secured in aperture 105 in body front 71 projects freely through aperture 107 in blade carrier 99 and permits free vertical movement of sausage slitting blade 95. The contoured distal end surface 109 of blade carrier 99 is adapted to ridingly engage the upper cylindrical surface portion of each sausage link L and limit the depth of cut of blade 95. A thumbscrew 111 threadedly fitted in blade carrier 99 adjustably clamps blade 95; turnably manipulating screw 111 adjusts the projection of blade point 97 past carrier surface 109 and provides manual adjustment means for regulating the depth of cut of blade 95.

A helical tension spring 113 and ball chain adjustment means 115 provide means for selectively adjusting the frictional contact between blade carrier distal end surface 109 and each sausage link L. A straplike support 117 is fixedly secured cantilever fashion to the underedge surface 119 of channelway body front 71 and is provided at its distal end with a slot 121 for receiving ball chain 123. Changing the effective length of ball chain 123 by inserting a desired one of the chain ball links behind the structure of slot 121 adjusts the downward pressure of blade carrier 99 on sausage links L.

Crowder means 17 provides means for resiliently urging sausage chain C inwardly radially relative to wheel rim 33 and affords frictional driving contact between feed wheel grooveway surfaces 45, 45, ribs 51, 51 and chain links L. Crowder means 17 includes a plurality of crowder spring assemblies (7 spring assemblies being illustrated) arranged intermittently along channelway 65 (see FIGS. 1 and 3). Each spring assembly 125 includes a long narrow flat spring 127 arranged longitudinally in channelway 65 and having a leading end 129 and a trailing end 131. A crowder spring pin 133 turnably extends through an aperture 135 in oven body front 71 and is fixedly secured right angularly by screw fasteners 137 to leading end 129 of spring 127.

Adjustment means including a nut 139 threadedly engaging slotted shank portion 141 of pin 133 provide adjustment means for selectively setting the turning movement of spring pin 133. Turnably manipulating lock nut 139 and spring pin 133 adjusts the tension of spring 127 and adjusts the pressure exerted by trailing end 131 of the spring against the successively moving sausage links. As may be seen in FIG. 1, adjustably setting spring 127 in a counterclockwise direction increases the tension exerted by spring 127 on sausage link L; conversely, turnably setting spring member 127 in a clockwise direction reduces or lessens the pressure exerted by the spring on sausage chain links L.

Spring 127 is curved upwardly slightly and its intermediate portion preferably is reduced to define oppositely arranged scalloped edges 143. The reduced intermediate portion defined by edges 143 provide means for weakening or reducing the tension of spring 127 and lessening the stiffness of the spring. The spring member of spring assemblies 125 each are adjusted to a desired setting; the plurality of crowder spring assemblies preferably is adjusted to permit positive driving action of the sausage chain but permit the chain to slip in the wheel grooveway in the event a stoppage or blockage of the movement of the sausage chain occurs.

Crowder means 17 also preferably includes a pair of crowder roller assemblies 145 arranged respectively forwardly and rearwardly of knife blade 95 (see FIGS. 1, 2 and 7). Each crowder roller assembly 145 preferably includes a cylindrical roller 147 journalled on an L-shaped shank 149 which in turn is pivotally secured at its proximal end 151 to a pivot pin 153 frictionally secured in aperture 155 in front 71 of body 69. A torsion spring 157 is convolutely arranged about proximal end 151 of shank 149 and resiliently reacts between pin 153 and shank 149. Horizontal distal portion 159 of crowder roller shank 149 extends through an oblong generally vertical aperture 161 in body front 71; crowder roller 147 is idly journalled on shank distal portion 159 and is adapted to rollingly engage and press downwardly on the upper cylindrical surface of each sausage chain link L. Sufficient frictional contact between pin 153 and aperture 155 is provided for holding pin 153 at a desired setting and torsion spring 157 at a desired tension. Turning counterclockwise on pin 153 increases tension of spring 157 and causes greater frictional contact between roller working surface 163 and the sausage links; conversely, turning clockwise on pin 153 lessens the force exerted by roller 147 on the sausage links.

A generally long curved finger 165 projecting tangentially into grooveway 39 provides means for lifting the sausage links out of the grooveway as feed wheel 13 is rotated (see FIGS. 1, 2 and 7). Support structure preferably in the form of vacuum wheel housing 167 supports finger 165 cantilever fashion generally horizontally and along an extended plane of rotation of grooveway 39. The proximal end portion of finger 165 is tightly received in a slotted recess 169 in upper surface 171 of vacuum housing 167. A screw fastener 173 extending through finger 165 and threadedly embedded in housing 167 rigidly supports finger 165. The distal end portion 175 of finger 165 is snugly but freely received in inner grooveway section 43 with the bottom and opposite side surfaces of finger distal portion 175 being closely spaced respectively from bottom and side surfaces 49, 47, 47 of inner grooveway section 43. The upper surface of finger 165 is adapted to slidingly engage the under cylindrical surface portion of sausage links L and to cause the sausage chain to move radially outwardly from grooveway 39.

Loosening means 23 for loosening slit skin casing C from around meat kernel K of each sausage link preferably includes a pair of stripper wheels 177, 177 journalled respectively on opposite sides of a vertical base 179 (see FIGS. 1, 2 and 8). Shouldered axle bolts 181, 181 threadedly secured respectively in the lower end portion of base 179 freely journal stripper wheels 177, 177 on base 179. Wheels 177, 177 are symmetrically arranged over and in divergingly canted configuration relative to the path and direction of travel of sausage links L. The oppositely facing rim portions of stripper wheels 177, 177 are chamfered as at 183, 183 and define respectively narrow rims 185, 185. The stripper wheel rims preferably are roughened or provided with serrations (see FIG. 8) and are adapted to rollingly engage opposite side portions of sausage links L. The convergingly canted arrangement of stripper wheels 177, 177 is adapted to cause rims 185, 185 to engage and press the slit skin casing C of the sausage links downwardly and from around sausage meat kernel K.

The means for mounting stripper wheels 177, 177 preferably include a generally horizontal arm 187 pivotally secured by pin means 189 at the proximal end portion thereof to a bridge 191 fixedly secured at intersecting surfaces 193 to the inward side of body front 71. The distal end portion of arm 187 is preferably split and arranged concentrically about the upper portion of base 179. A thumbscrew 195 extends through tab portions 197, 197 (one shown) of arm 187 and is adapted to clamp the distal end of arm 187. Turnably manipulating thumbscrew 195 permits vertical adjustment of base 179 and thus stripper wheels 177, 177 relative to sausage link L. A flat leaf spring 199 fixed at its proximal end to bridge 191 is adapted to press downwardly on arm 187 and to resiliently urge stripper wheels 177, 177 downwardly against the sausage links.

Loosening means 23 also preferably includes compressed air jet means for loosening the split skin casing from the meat kernel of each sausage link. Base 179 is preferably provided with a pair of vertical passageways opening respectively in downwardly directed port openings 201, 203. The upper portion of base 179 is hollow and compressed air (from any suitable source) entering through air supply conduit 205 passes downwardly through ports 201, 203 and between stripper wheels 177, 177. The jetted air issuing from ports 201, 203 projects between the skin casing and meat kernel of each sausage link and loosens the casing and kernel. Stripper wheels 177, 177 in addition to holding the sausage link downwardly against vacuum wheel housing 167 also provide means for confining and directing the air under the sausage skin casing.

A guide roller 207 is mounted closely forwardly of stripper wheels 177, 177 and is adapted to guidingly constrain the moving chain of sausages in a straight line path as they are being acted on by the stripper wheels. Guide roller 207 is provided with a deeply grooved rim conforming substantially to the cross-sectional cylindrical configuration of sausage links L. Guide roller 207 is journalled on an axle 208 adjustably fixed in the rearward end portion of front 71 of body 69. A slot 209 in front 71 extending radially of feed wheel 13 receives the axle of roller 207 and permits radial adjustment of the roller relative to the feed wheel. Roller 207 is arranged directly above finger 165 and the moving chain of sausages passes between the finger and roller.

Pivot structure including a pin 211 fixedly secured horizontally on support structure 31 and a bushing 213 secured on the forward end portion of body 69 provides means for pivotal displacement of body 69. In the preferred form of the apparatus as above-described, body 69 provides unitary support structure for simultaneous displacement of crowder means 17 including crowder spring and roller assemblies 125, 125; knife means 21 including blade carrier 99 and blade 95; and loosening means 23 including stripper wheels 177, 177 and compressed air ports 201, 203. Manually lifting body 69 upwardly about the pivot axis of pin 211 pivotally moves substantially all the structure from over the feed wheel and permits ready access to the feed wheel upper rim portion and grooveway.

The means for remotely separating skin casings C from meat kernels K includes a hollow vacuum wheel 215 having a perforated rim 217 supported and driven on an axle 219. The upper cylindrical portion of rim 217 is arranged generally tangentially relative to vacuum wheel housing surface 171. Vacuum wheel 215 is driven in a counterclockwise direction (see FIG. 2) and is adapted to carry the meat-free casings around the periphery of rim 217 through passageway 221 and below the vacuum wheel. A vacuum pump 223 mounted on a fully closed container 225 is adapted to evacuate the air from the container and to cause the sausage casing to be drawn into the container. A door 227 provides access means for the removal of the sausage casings from the container. FIG. 9 illustrates a preferred configuration of each perforation 229 in rim 217 of the vacuum wheel. Each of the radially extending perforations is preferably countersunk as indicated at 231; the diameter of each perforation at its exterior opening is appreciably larger than the diameter of the perforation at its interior opening. By countersinking each perforation 229, a larger area of the sausage skin casing may be acted on under vacuum and a more effective casing stripping action is provided. Also, countersinking perforations 229 afford means for spacing the perforations in very close arrangement without weakening the rim structure of the vacuum wheel.

The second embodiment, as partially shown in FIGS. 10 and 11, is substantially the same as the hereinabove described preferred embodiment but includes additionally a pair of stripper rollers 233, 233. The stripper rollers are journalled respectively on strap-like brackets 235, 235 secured in laterally spaced arrangement on surface 171 of vacuum wheel housing 167. Threaded fasteners 237, 237 extending respectively through the rearward end portions of brackets 235, 235 and secured in vacuum wheel housing 167 provide adjustment means for convergingly-divergingly adjusting rollers 233, 233. The stripper rollers are idly journalled respectively on the forward end portions of brackets 235, 235 and are correspondingly convergingly canted upwardly and forwardly relative to the path and direction of movement of the sausage links.

The cylindrical working surfaces respectively of rollers 233, 233 are roughened to provide somewhat severe frictional engagement with the skin casing of the successively moving sausage links. Stripper rollers 233, 233 are arranged forwardly of stripper wheels 177', 177' (one shown) and assist the stripper wheels in removing the skin casing from the sausages. As each sausage link is moved between stripper rollers 233, 233, the cylindrical working surfaces of the rollers engage and urge downwardly the split portions of the sausage casing; stripper rollers 233, 233 aid in opening the slit casings and provide means for better air injection between the casings and kernels of the sausages.

While I have shown and described preferred embodiments of the present invention, it will be understood that various modifications in the disclosed structure may be made without departing from the spirit and scope of the invention.

I claim:

1. Apparatus for skinning the casing from the meat kernel of each sausage link of a chain of linked sausages comprising a large-diametered feed wheel supportingly journalled on a horizontal axis and adapted to be driven continuously unidirectionally, said feed wheel having rim groove structure extending along said wheel rim and defining a continuous grooveway opening radially outwardly of said wheel rim, said sausage chain being adapted to be received in said grooveway and to engage the rim groove structure of a sector of said feed wheel, the sausage chain upon rotative movement of said wheel being conveyed continuously in an arced path defined substantially by said groove structure of said feed wheel, infeed means for guidingly conducting the links of sausage chain successively into engagement with the grooveway of said feed wheel rim, crowder means intermittently spaced along a substantial portion of said rim groove structure of said sector of said wheel for resiliently urging said sausage chain links radially inwardly relative to said feed wheel for affording frictional driving contact between said feed wheel rim groove structure and the sausage chain links, oven means arranged at least along a portion of the arced path of the sausage chain for heating the sausage links successively as they are moved along said path, knife means for longitudinally slitting the heated sausage links successively as the sausage chain moves along the arced path, means for lifting the slitted sausage links radially outwardly from the grooveway of said feed wheel rim, case loosening means for loosening the split skin case from the meat kernel of each sausage link lifted from said grooveway, and means for remotely separating the loosened skin casing from the meat kernal of each sausage link of the sausage chain.

2. An apparatus according to claim 1 wherein said oven means includes structure defining substantially a longitudinally arced, transversely U-surfaced channelway opening radially inwardly along the length of said oven structure and wherein said oven structure is arranged generally concentrically along the rim groove structure of said feed wheel, said feed wheel rim structure at said sector of said feed wheel being freely but snugly received in said oven structure channelway and upon rotation of said feed wheel, the rim portion thereof being adapted to convey the sausage chain through said oven channelway; and includes heat means for heating the space enclosed by said oven channelway thereby heating and conditioning the sausage links as they move through said channelway.

3. An apparatus acording to claim 2 wherein said oven structure defining said U-shaped channelway includes fixed and movable structure adapted for mating engagement, said fixed structure including a vertical back stationarily arranged along the back side of the oven structure, said movable structure including a generally crescent-shaped body including a vertical front member and a curved top member fixedly joined relatively transversely in generally right angular relation, said body being adapted to be arranged in an operative disposition with said top member matingly engaging said stationary back and with said front member being arranged along the front side of said feed wheel rim structure.

4. An apparatus according to claim 3 which additionally includes unitary support means securing said oven body, said crowder means, said knife means, and substantially said means for loosening said skin casings together in simultaneously displaceable relationship, and selectively operable means for supportably arranging said unitary support means including said oven body, crowder means, knife means and substantially said case loosening means in operative positions relative to said feed wheel rim or in inoperative positions and remote from said feed wheel rim.

5. An apparatus according to claim 3 wherein said crowder means includes a plurality of crowder spring assemblies intermittently arranged generally along said U-shaped channelway and wherein each spring assembly includes a long narrow flat spring member arranged longitudinally in said channelway and having a leading and a trailing end and with said trailing end of said spring member being adapted to engage the sausage links and to urge the links inwardly in the grooveway structure of said feed wheel rim, a spring pin turnably supported on a horizontal axis in said oven body front member and substantially fixedly secured in right angular relationship with the leading end of said spring, and adjustment means for selectively setting the turning movement of said spring pin, thereby adjustably varying the tension of said spring and the pressure exerted by the trailing end of said spring member against the moving chain of sausage links.

6. An apparatus according to claim 5 wherein said crowder means includes at least one crowder roller assembly including a crowder roller and means rotatably mounting said crowder roller on a horizontal laterally displaceable axis, said roller being arranged radially outwardly of said feed wheel rim structure and spaced closely adjacent the blade of said knife means, and including crowder roller spring means for resiliently urging said crowder roller axis toward said feed wheel rim and said crowder roller workng surface against the chain of successively moving sausage links.

7. An apparatus according to claim 1 wherein said knife means includes a flat blade having an edge-sharpened end, a curved blade carrier having means at one end thereof for removably clamping said blade, and including means pivotally mounting said blade carrier at that end remote from said blade and on a horizontal pivot axis, said edge-sharpened end of said blade being adapted to slit successively the chain of moving links of sausages.

8. An apparatus according to claim 1 wherein said means for lifting the sausage links successively radially outwardly from said feed wheel rim grooveway includes substantially rigid finger structure firmly mounted substantially cantilever fashion and extending along an extended plane of rotation of said feed wheel rim grooveway, said finger structure being arranged generally tangentially of said rim grooveway and with the distal end of said finger structure projecting into said grooveway radially inwardly of a sausage link received in said groove way, and with said distal end of said finger structure projecting generally in a direction counter to the direction of rotation of said feed wheel.

9. An apparatus according to claim 1 wherein said means for loosening the split case from around the meat kernel of each sausage link includes a pair of stripper wheels having roughened rim surfaces, a generally vertical base, means fixedly journalling each stripper wheel on said base with said pair of stripper wheels being arranged on opposite sides of the lower end portion of said base and with the lower portions of the pair of stripper wheels being arranged below said base, and mounting means mounting said pair of stripper wheels symmetrically over and in a divergingly canted configuration relative to the path and direction of travel of the sausage links.

10. An apparatus according to claim 9 wherein said loosening means includes compressed air jet means for loosening the case from the meat kernel of each sausage link and includes port structure arranged substantially between said pair of stripper wheels and so arranged to cause at least one downwardly projected jet of compressed air acting substantially between said pair of stripper wheels, the confronting inside surfaces and the lower portions of said pair of stripper wheels acting substantially to confine the air issuing from said port structure and to direct the pressured air into and under the split case of each sausage link.

11. An apparatus according to claim 10 wherein said means for loosening the split casing from around the meat kernel of each sausage link includes a case loosening guide roller having a deeply grooved rim, and with said roller being journalled on a horizontal axis and in substantially closely spaced arrangement directly above said finger and with each link of said sausage chain being adapted to pass between said roller and said finger and with the grooved rim of said loosening roller being adapted to guidingly conduct each sausage link between said pair of stripper wheels and under said port structure.

12. An apparatus according to claim 10 wherein said means for remotely separating the case from the meat kernel of each sausage includes a hollow vacuum wheel having a generally cylindrical perforated rim, means supportingly journalling said vacuum wheel subjacently of said pair of stripper wheels with the upper peripheral portion of said perforated rim being generally tangentially arranged relative to the path of movement of said sausage links, vacuum housing means arranged about said vacuum wheel, and vacuum generating means communicating with said housing means for causing currents of vacuumed air to flow through the perforations of the rim of said vacuum wheel.

13. An apparatus according to claim 12 wherein substantially each perforation of the rim of said vacuum wheel is generally circular and opening radially of said wheel, and wherein the diameter of each perforation at its exterior opening is appreciably larger than the diameter of said perforation at its interior opening.

14. An apparatus according to claim 1 wherein said means for loosening the split case from around the sausage link includes a pair of stripper rollers, each roller having a generally cylindrical roughened working surface, and support means supportingly journalling said pair of rollers on opposite sides and symmetrically of the path of travel of said sausage links and with the axes of rotation of said pair of stripper rollers being correspondingly convergingly canted upwardly and correspondingly canted forwardly relative to the path and direction of movement of said sausage links.

References Cited

UNITED STATES PATENTS

| 2,702,404 | 2/1955 | Rufenach | 17—1 |
| 2,954,579 | 10/1960 | Menghini | 17—1 |
| 3,023,452 | 3/1962 | James et al. | 17—1 |
| 3,312,995 | 4/1967 | Garey | 17—1 |
| 3,390,422 | 7/1968 | Doyle | 17—1 |

LUCIE H. LAUDENSLAGER, Primary Examiner

U.S. Cl. X.R.

17—49